United States Patent [19]
Farris et al.

[11] Patent Number: 5,611,557
[45] Date of Patent: Mar. 18, 1997

[54] BICYCLE SUSPENSION SYSTEM

[76] Inventors: Mark S. Farris, 209 Willoway;
Michael A. Harrison, 1405 Warm Springs Rd., both of Ketchum, Id. 83340

[21] Appl. No.: 236,464

[22] Filed: May 2, 1994

[51] Int. Cl.$^6$ ................................ B62K 25/28
[52] U.S. Cl. ........................... 280/275; 280/284
[58] Field of Search ................... 280/283, 284, 280/285, 286, 288, 275; 180/227

[56] References Cited

U.S. PATENT DOCUMENTS

| 4,765,432 | 8/1988 | Odom | 180/227 |
| 5,029,888 | 7/1991 | Allsop et al. | 280/281.1 |

FOREIGN PATENT DOCUMENTS

| 0497017 | 11/1919 | France | 280/284 |
| 0021274 | 8/1920 | France | 280/284 |
| 1139540 | 7/1957 | France | 280/284 |
| 0362340 | 10/1922 | Germany | 280/283 |
| 0446752 | 7/1927 | Germany | 280/275 |

OTHER PUBLICATIONS

Copy of brochure for Cannondale "Super V" frameset (1 page).

*Primary Examiner*—Anne Marie Boehler
*Attorney, Agent, or Firm*—Lyon & Lyon

[57] ABSTRACT

An improved bicycle suspension system wherein the suspension system's characteristics change according to whether a rider is in a standing position or a sitting position. In a standing position, the rider's weight is placed primarily upon the pedal assembly of the bicycle, thereby creating an upward force on the swing arm which places a first compression force upon a shock absorber. In a sitting position, the rider's weight is also placed on a seat of a seat frame. This places a downward force on the seat frame which places a second compression force on the shock absorber. Thus, in the sitting position, the combination of the first and second compression forces, measured as a leverage ratio, is placed upon the shock absorber. In this sitting position situation, the shock absorber is more responsive to irregularities in the road, and provides a softer ride with greater traction and control. In the standing position, since only a first compression force is being exerted against the shock absorber, the suspension system is stiffer and provides a less comfortable ride. However, this allows for a more efficient transfer of pedaling energy which would otherwise be lost due to a "bobbing" effect which exists in softer suspension systems.

10 Claims, 8 Drawing Sheets

BICYCLE SUSPENSION SYSTEM

FIELD OF THE INVENTION

This invention relates to bicycles, and specifically to an improved suspension system for a bicycle wherein the suspension system's characteristics change according to a rider's position on the bicycle.

BACKGROUND OF THE INVENTION

Unlike automobiles and motorcycles, bicycles were not originally designed with a shock absorbing suspension system. A typical bicycle usually had a standard configuration comprising a front wheel and a rear wheel connected to a bicycle frame, with the only means of shock absorption being the air in the tires.

However, as bicycle riders began placing increasing demands on their bicycles by riding through rougher terrain, such as mountain trails, they looked for better ways to prevent road surface irregularities from being transmitted to the rider. Thus, bicycle manufacturers started incorporating shock absorbing suspension systems into the design of the bicycles.

Today, it is common to see shock absorbers in the front forks of a bicycle for absorbing shocks transmitted through the front tire. Also, in bicycles with full suspension systems comprising swing arms, it is common to see the swing arm of the bicycle pivotally connected, via springs or pistons for example, to the bicycle frame in some shock absorbing manner for absorbing shocks transmitted through the rear tire.

The term "shock absorber" is used throughout this specification to refer to a spring/damper type system. It is noted that other types of shock absorbing components which serve an equivalent purpose may be used in place of a spring/damper system, and such equivalent components are intended to be encompassed by the use of the term "shock absorber."

In addition, a person of ordinary skill in the art understands that a suspension system's characteristics can refer to characteristics such as stiffness and compression rate, but are not limited solely to these characteristics.

The implementation of these shock absorbing systems provided a softer ride for the bicyclist traveling over rougher terrain, as well as better traction and control, but these systems also created new drawbacks. For example, a bicyclist will typically stand and pedal while sprinting or while climbing hills in order to deliver more power to the wheels via a pedal assembly by using the rider's entire body weight to exert downward pressure on the pedals. During these instances, the power is delivered in a cyclical, rhythmic manner that causes the bicycle to sway side-to-side and induces tremendous vertical impulses.

In most bicycles implementing a rear wheel suspension system as described above, these impulses cause the suspension system to compress and rebound, referred to as "bobbing", thus resulting in the loss of energy which would otherwise have been directed toward moving the bicycle forward.

In order to mitigate the amount of energy wasted due to this "bobbing" effect, current designs are set with the shock absorber's spring preloaded to a very high tension, with almost no sag in the setup, which in turn makes the suspension very stiff and relatively ineffective from a traction and comfort standpoint.

Thus, for the reasons stated above, there is a need and a desire for an improved suspension system for a bicycle which (1) offers a softer suspension with better traction when a rider is "in-the-saddle," an expression for describing a sitting position, or sitting on a seat, and (2) offers a stiffer suspension when a rider is, "out-of-the-saddle," an expression for describing a standing position, or not sitting on a seat.

A softer suspension is desirable for better traction and control as well as shock absorption and comfort, while a stiffer suspension is desirable for the reduction of lost "bobbing" energy, and a more efficient transfer of that energy toward the forward movement of the bicycle.

SUMMARY OF THE INVENTION

The suspension system of the present invention provides a comfortable ride with traction and control while reducing the bobbing effect prevalent in softer comfort suspension setups.

This invention provides an improved bicycle suspension system wherein the suspension system's characteristics change according to whether a rider is in a sitting position or a standing position.

The design of the bicycle of the present invention exhibits very different characteristics when a rider is sitting in the saddle, as contrasted to when a rider is standing out of the saddle. This difference is discussed below.

OUT OF THE SADDLE

When a rider is out of the saddle, the suspension is loaded only by the pivoting of the swing arm itself as a result of the weight of the rider being placed primarily on the pedals. The rider's weight exerts a downward force on the main frame of the bicycle which creates a related upward force on the swing arm, thereby exerting a first compressing force against the shock absorber.

When the rider is in a standing position, one can ignore the seat frame and its effect on the suspension. The compressing force against the shock absorber can be expressed as a leverage ratio. This leverage ratio can be described as a ratio of the vertical rear wheel travel relative to the main frame versus the shock absorber compression travel. In this standing position, for example, if the rear wheel travels 3 inches upward relative to the main frame, and the shock absorber compresses 1 inch, then the leverage ratio is calculated to be a 3:1 leverage ratio.

IN THE SADDLE

When a rider is in the saddle, both the seat frame and the swing arm place a load on the shock absorber. Thus, the leverage ratio on the shock absorber is higher when the load is placed from both the seat frame and the swing arm. Since the leverage of the seat frame is added to the leverage of the swing arm, this results in a softer suspension system.

In the sitting position, for example, there are two leverage ratio components. When the rider is seated on the bicycle, if the seat frame moves vertically 1 inch downward relative to the main frame while the shock absorber compresses 1 inch, the leverage ratio is calculated to be 1:1. Since the weight of the rider on the main frame is the same as if the rider where standing, the rear wheel will still move vertically upward 3 inches relative to the main frame while the shock absorber compresses 1 inch, thereby providing a leverage ratio calculated to be 3:1 for the swing arm. Thus, the combined leverage ratio placed on the shock absorber when the rider is in a seated position is calculated and added to be 4:1.

Therefore, when in a seated position, the rider exerts a greater leverage on the shock absorber (leverage ratio of 4:1) than when the rider is in a standing position (leverage ratio of 3:1). A higher leverage ratio produces a more responsive and softer suspension system which is desirable when traction, control and comfort are the primary objectives. By having a softer suspension, the rear wheel will rebound down to the ground after going over a bump, whereas in a stiffer suspension, the rear wheel would "jump" the bump. However, a lower leverage ratio produces a stiffer suspension system which is desirable when maximum efficiency of energy transfer is the primary objective.

Accordingly, it is an object of the present invention to provide an improved suspension system for a bicycle.

It is a further object of the present invention to provide an improved suspension system for a bicycle wherein the suspension system's characteristics change according to the position of the rider.

An additional object of the present invention is to provide an improved suspension system for a bicycle wherein the suspension system's characteristics change according to the position of the rider while maintaining the seat in its maximum extended upwardmost position.

Another object of the present invention is to provide an improved suspension system for a bicycle that allows for a seat activated hydraulic adjustment of the suspension system's characteristics.

Still another object of the present invention is to provide an improved suspension system for a bicycle that allows for a seat activated mechanical adjustment of the suspension system's characteristics.

Yet another object of the present invention is to provide an improved suspension system for a bicycle that maximizes traction, control and comfort in a sitting position while maximizing efficiency of energy transfer in a standing position.

Still another object of the present invention is to provide a seat and shock absorber package for retrofitting a full suspension bicycle to implement an improved suspension system for a bicycle wherein the suspension system's characteristics change according to the position of the rider.

Further objects and advantages of the invention will become apparent from a consideration of the drawings and ensuing description.

DESCRIPTION OF THE PREFERRED EMBODIMENTS OF THE INVENTION

Figure 1A:
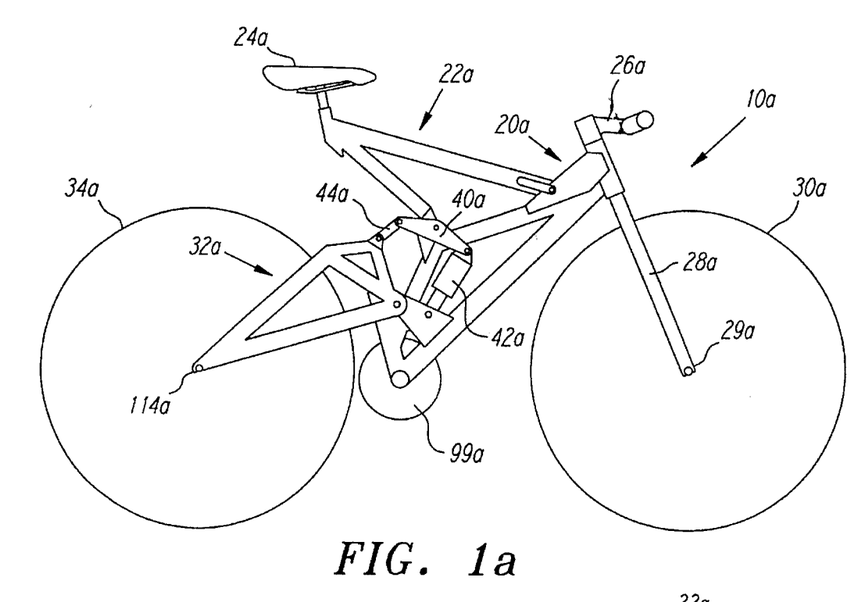
FIG. 1a is an elevational view of a preferred embodiment of an improved suspension system for a bicycle.
Figures 1B, 1C, 1D:
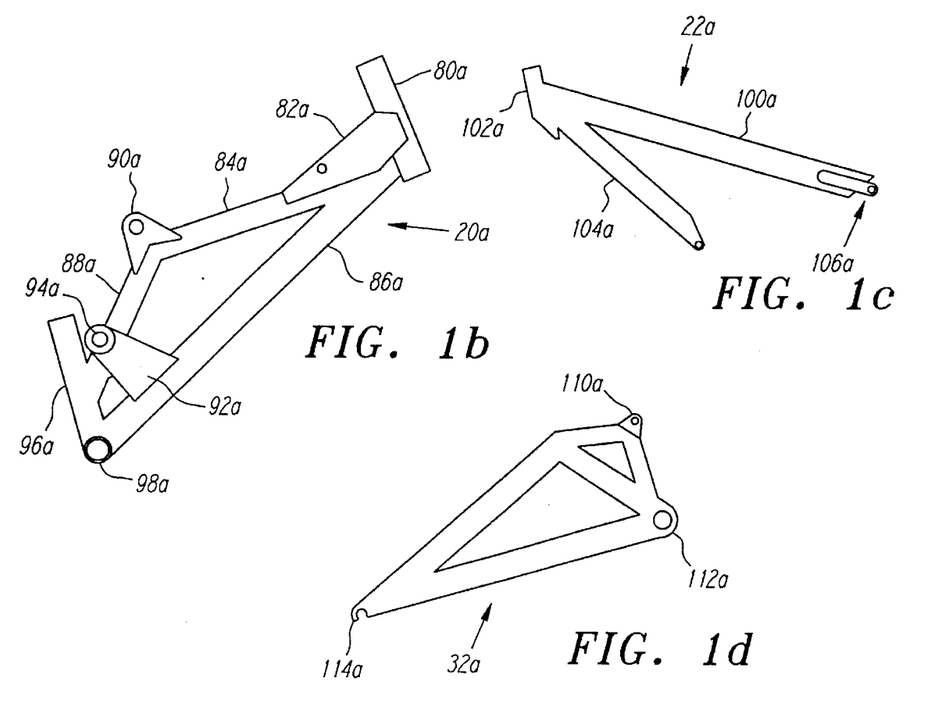
FIG. 1b is a detailed view of the main frame.
FIG. 1c is a detailed view of the seat frame.
FIG. 1d is a detailed view of the swing arm.

FIG. 1 EMBODIMENT DESCRIPTION

FIGS. 1a–1d illustrate a preferred embodiment of an improved suspension system for a bicycle 10a. The bicycle 10a comprises a main frame 20a, a seat frame 22a and a swing arm 32a.

As better shown in FIG. 1b, the main frame 20a comprises a head tube 80a, a head tube gusset 82a, a top tube 84a, a down tube 86a, a rear tube 88a, a rocker arm bracket 90a, a pivot gusset 92a, a swing arm pivot bracket 94a, a derailleur tube 96a and a bottom bracket 98a. A pedal assembly 99a, as partially shown in FIG. 1a, is attached to the bottom bracket 98a in a standard manner.

As better shown in FIG. 1c, the seat frame 22a comprises a main tube 100a, a seat tube 102a, a connector tube 104a, and a main tube pivot link 106a.

As better shown in FIG. 1d, the swing arm 32a comprises a link bracket 110a, a swing arm pivot 112a and a rear wheel axle attachment 114a.

Referring back to FIG. 1a as well as FIGS. 1b–1d, a handle bar 26a for turning a front wheel 30a is connected to the main frame 20a. The front wheel 30a is connected to the main frame 20a by a front fork 28a via a front wheel axle attachment 29a. A seat 24a (also referred to as a saddle) is connected to the seat frame 22a via the seat tube 102a.

The seat frame 22a is attached to the main frame 20a by connecting the main tube pivot link 106a of the seat frame 22a to the head tube gusset 82a of the main frame 20a, and by attaching the connector tube 104a of the seat frame 22a to a rocker arm 40a which is connected to the rocker arm bracket 90a of the main frame 20a. A shock absorber 42a is attached to the rocker arm 40a and the pivot gusset 92a.

The swing arm 32a is attached to the main frame 20a by connecting the swing arm pivot 112a of the swing arm 32a to the swing arm pivot bracket 94a of the main frame 20a, and by connecting the link bracket 110a of the swing arm 32a to a connecting link 44a which connects to the rocker arm 40a which then connects to the rocker arm bracket 90a. A rear wheel 34a is attached to the swing arm 32a via a rear wheel axle attachment 114a.

Figure 2A:
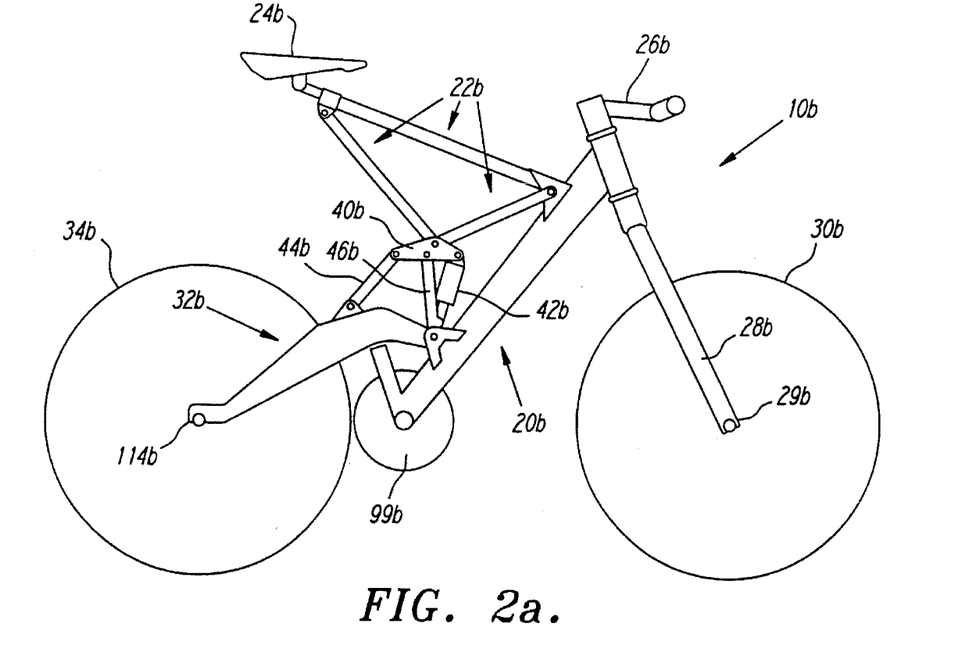
FIG. 2a is an elevational view of another preferred embodiment of an improved suspension system for a bicycle.

The swing arm 32a can be fabricated in various ways. For instance, FIG. 1 shows a space frame type tubing, whereas FIG. 2, further described below, shows a monocoque frame which can be made from aluminum sheet or molded carbon fiber, and without the use of tubing.

OPERATION OF THE SUSPENSION SYSTEM OF FIG. 1

Referring to FIGS. 1 a–1d, the operation of the suspension system is discussed first wherein a rider is out of the seat 24a, or in a standing position.

STANDING POSITION: When a rider is in a standing position, the weight of the rider is placed primarily upon the pedals (not shown) of the pedal assembly 99a in the usual manner.

When the rear wheel 34a encounters an irregularity in the road, the rear wheel 34a, along with the swing arm 32a, will move accordingly in an upward vertical rotational motion pivoting about the swing arm pivot bracket 94a. The connecting link 44a is pushed up against one end of the rocker arm 40a which causes the rocker arm 40a to pivot about the rocker arm bracket 90a, thereby exerting a first compressing force upon the shock absorber 42a.

Since the rider is in a standing position, there is no weight being exerted downward against the seat frame 22a, and correspondingly, there is no second compression force being exerted against the shock absorber 42a by the seat frame 22a.

When the rider is in a standing position, one can ignore the seat frame 22a and its effect on the suspension system. The first compressing force against the shock absorber 42a can be expressed as a leverage ratio. This leverage ratio can be described as a ratio of the vertical rear wheel 34a travel relative to the main frame 20a versus the shock absorber 42a compression travel. As an example, in a standing position scenario, if the rear wheel 34a travels 3 inches upward relative to the main frame 20a due to the weight of the rider on the pedals, and the shock absorber 42a compresses 1 inch, then the leverage ratio is calculated to be a 3:1 leverage ratio.

As previously discussed, this ratio, which is lower than the ratio when the rider is in a sitting position, provides a stiffer suspension system which is desirable when efficiency of energy transfer is a primary objective.

Next, the operation of the suspension is discussed wherein the rider is on the seat 24a, or in a sitting position.

SITTING POSITION: When seated, the weight of the rider exerts a downward force upon the seat frame 22a via the seat 24a. The seat frame 22a, acting in conjunction with the swing arm 32a, then exerts a downward rotational force on the rocker arm 40a causing it to pivot in a direction so as to exert a second compressing force on the shock absorber 42a.

When a rider is in the seat 24a, both the seat frame 22a and the swing arm 32a place a load on the shock absorber 42a. Thus, the leverage ratio on the shock absorber 42a is higher when the load is placed from both the seat frame 22a and the swing arm 32a, since the leverage of the seat frame 22a is added to the leverage of the swing arm 32a, and this results in a softer suspension.

In this example, there are two leverage ratio components. If the seat frame 22a moves vertically 1 inch downward relative to the main frame 20a while the shock absorber 42a compresses 1 inch, the leverage ratio is calculated to be 1:1. If the rear wheel 34a moves vertically upward 3 inches relative to the main frame 20a while the shock absorber 42a compresses 1 inch, the leverage ratio is calculated to be 3:1. Thus, the combined leverage ratio placed on the shock absorber 42a when the rider is in a seated position is calculated and added to be 4:1.

Figure 4A:
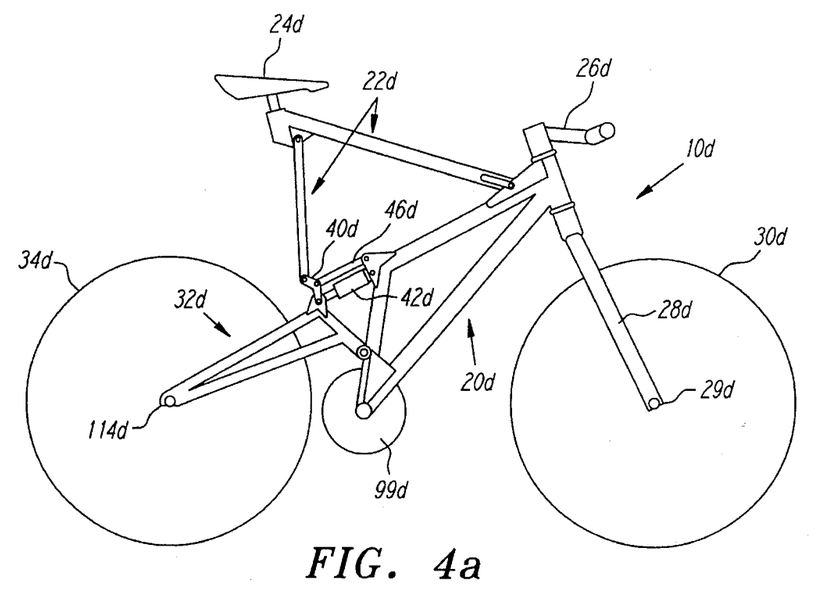
FIG. 4a is an elevational view of yet another preferred embodiment of an improved suspension system for a bicycle.

Furthermore, through the use of the rocker arm 40a, it is possible to achieve more flexibility in adjusting and tuning the suspension system. The suspension system characteristics for the seat frame 22a, swing arm 32a, and shock absorber 42a can each be adjusted individually and independent from each other. This is true because the relationship of each of these components to the rocker arm 40a pivot point can be modified without affecting the characteristics of the remaining components. This flexibility applies to any embodiment which makes use of a rocker arm 40. For example, as described below, FIGS. 2 and 4 incorporate this flexibility as well through the use of a rocker arm 40.

Applicability of the Operation Concept to Remaining FIGS.

Figure 5A:
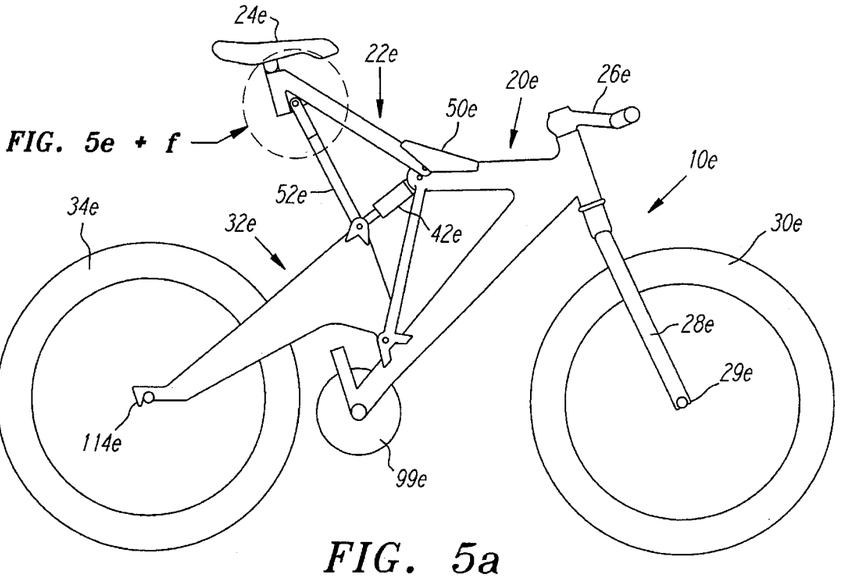
FIG. 5a is an elevational view of another preferred embodiment of an improved suspension system for a bicycle.
Figure 6A:
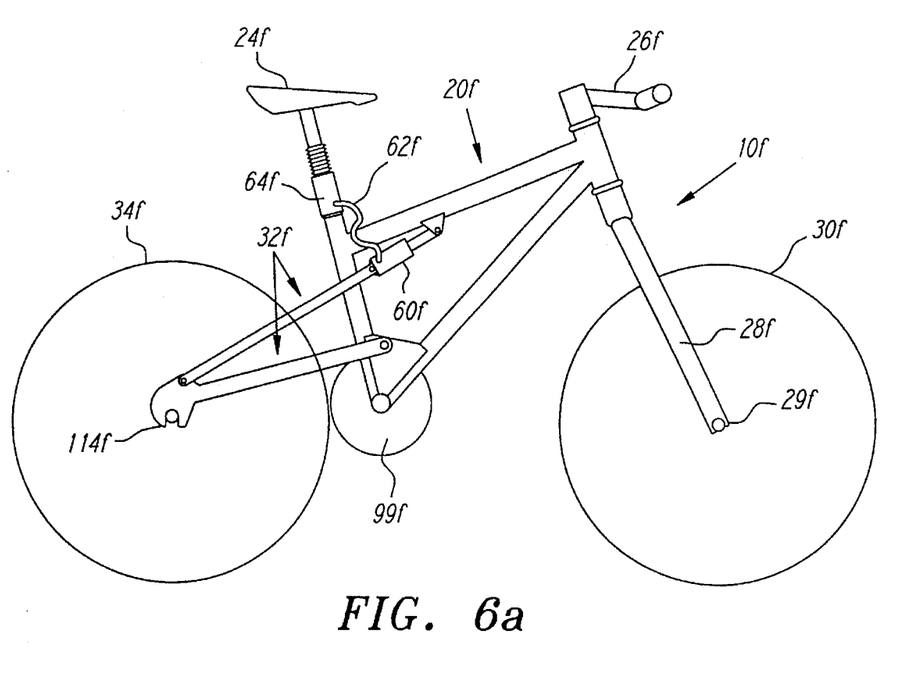
FIG. 6a is an elevational view of a variation on an improved suspension system for a bicycle.
Figures 7A, 7E:
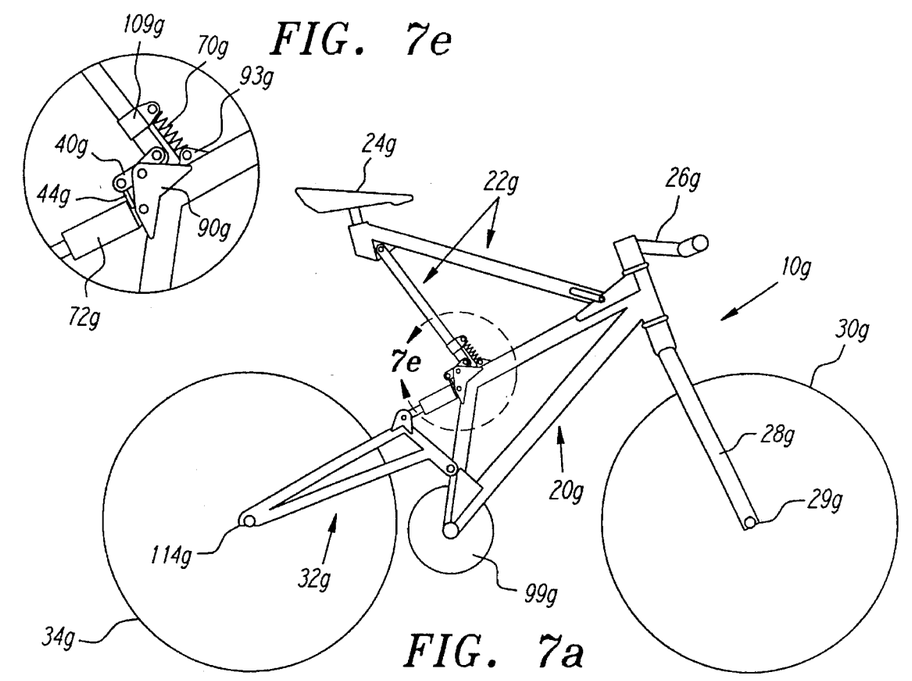
FIG. 7a is an elevational view of another variation on an improved suspension system for a bicycle.
FIG. 7e is a cutaway detail view of the linkage of the main frame, seat frame, and swing arm.

The description of the operation of the present invention discussed above is applicable to the remaining embodiments in FIGS. 2–5 as well. A person of ordinary skill in the art understands that, while structural variations may exist between FIGS. 1–5, the concept of the improved suspension system can be applied to these and other various embodiments. Variations in the operation of FIGS. 6 and 7 are discussed further in their respective sections.

With that understanding, the following embodiments are structurally described in full detail, but the complete operation of the suspension system is not. These various embodiments represent different design approaches which may be taken by persons of ordinary skill in the art. Some of the embodiments disclose unique and useful features which are not disclosed in the other various embodiments. It is to be understood that a person of ordinary skill in the art can take these unique concepts and apply them to any of the other various embodiments as disclosed herein, and as may be developed from the teachings of this disclosure.

Figures 2B, 2C, 2D:
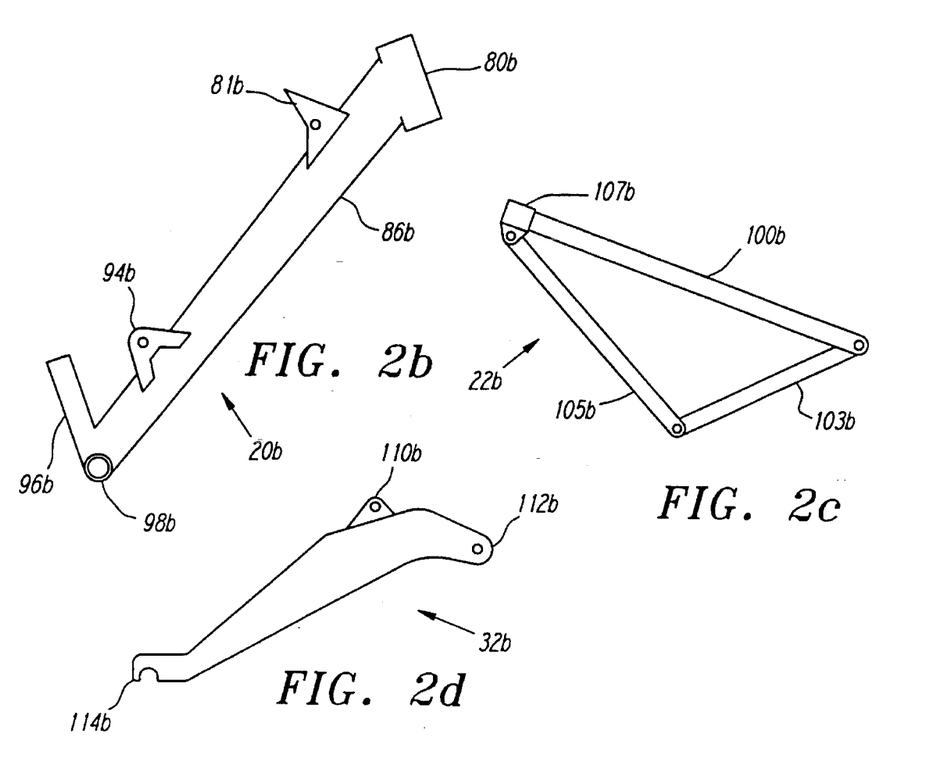
FIG. 2b is a detailed view of the main frame.
FIG. 2c is a detailed view of the seat frame.
FIG. 2d is a detailed view of the swing arm.

FIG. 2 Embodiment Description

FIGS. 2 a–2d illustrate another preferred embodiment of an improved suspension system for a bicycle 10b. The bicycle 10b comprises a main frame 20b, a seat frame 22b and a swing arm 32b.

As better shown in FIG. 2 b, the main frame 20b comprises a head tube 80b, a seat frame bracket 81b, a down tube 86b, a swing arm pivot bracket 94b, a derailleur tube 96b and a bottom bracket 98b. A pedal assembly 99b, as partially shown in FIG. 2a, is attached to the bottom bracket 98b in a standard manner.

As better shown in FIG. 2c, the seat frame 22b comprises a main tube 100b, a front connector tube 103b, a rear connector tube 105b and an adjustable collar pivot 107b.

As better shown in FIG. 2d, the swing arm 32b comprises a link bracket 110b, a swing arm pivot 112b and a rear wheel axle attachment 114b.

Referring back to FIG. 2a as well as FIGS. 2 b–2d, a handle bar 26b for turning a front wheel 30b is connected to the main frame 20b. The front wheel 30b is connected to the main frame 20b by a front fork 28b via a front wheel axle attachment 29b. A seat 24b is connected to the seat frame 22b via the adjustable collar pivot 107b.

The seat frame 22b is attached to the main frame 20b by connecting the main tube 100b of the seat frame 22b to the seat frame bracket 81b of the main frame 20b, and by attaching the rear connector tube 105b of the seat frame 22b to a rocker arm 40b which is connected to a rocker arm strut 46b which in turn connects to the swing arm bracket 94b of the main frame 20b. The front connector tube 103b connects between the seat frame bracket 81b and the rocker arm 40b. A shock absorber 42b is attached to the rocker arm 40b on one end, and the rocker arm strut 46b and the swing arm pivot bracket 94b on the other end. The rocker arm strut 46b acts as the pivot point for the rocker arm 40b.

The swing arm 32b is attached to the main frame 20b by connecting the swing arm pivot 112b of the swing arm 32b to the swing arm pivot bracket 94b of the main frame 20b, and by connecting the link bracket 110b of the swing arm 32b to a connecting link 44b which connects to the rocker arm 40b which then connects to the rocker arm strut 46b which in turn connects to the swing arm pivot bracket 94b. A rear wheel 34b is attached to the swing arm 32b via a rear wheel axle attachment 114b.

Figure 3A:
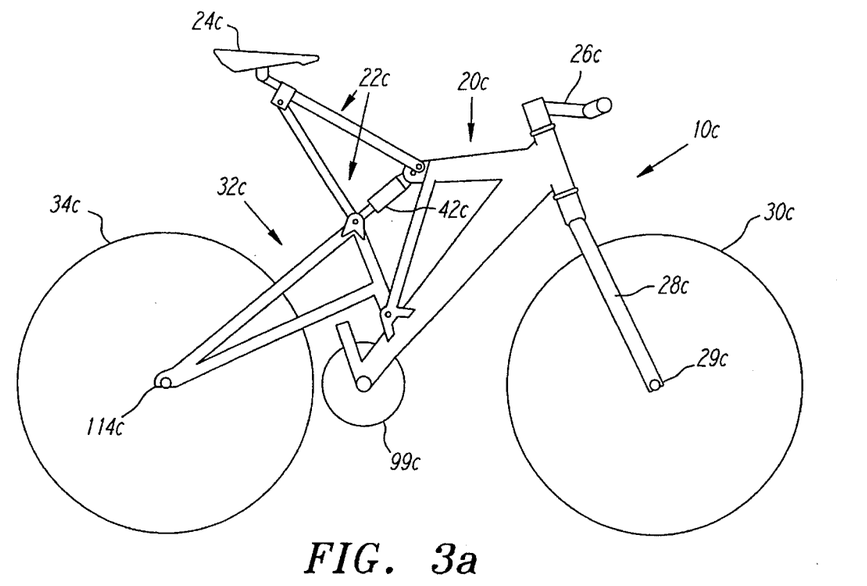
FIG. 3a is an elevational view of still another preferred embodiment of an improved suspension system for a bicycle.
Figures 3B, 3C, 3D:
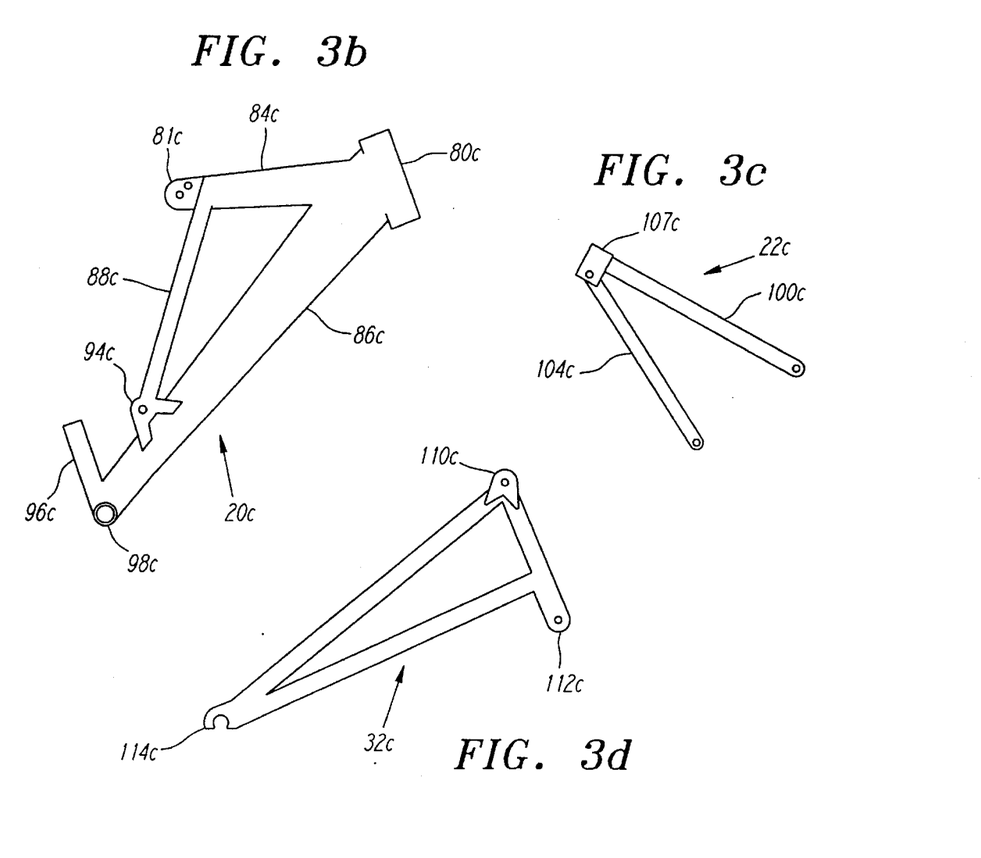
FIG. 3b is a detailed view of the main frame.
FIG. 3c is a detailed view of the seat frame.
FIG. 3d is a detailed view of the swing arm.

FIG. 3 Embodiment Description

FIGS. 3a–3d illustrate a preferred embodiment of an improved suspension system for a bicycle 10c. The bicycle 10c comprises a main frame 20c, a seat frame 22c and a swing arm 32c.

As better shown in FIG. 3b, the main frame 20c comprises a head tube 80c, a seat frame bracket 81c, a top tube 84c, a down tube 86c, a rear tube 88c, a swing arm pivot bracket 94c, a derailleur tube 96c and a bottom bracket 98c. A pedal assembly 99c, as partially shown in FIG. 3a, is attached to the bottom bracket 98c in a standard manner.

As better shown in FIG. 3d, the seat frame 22c comprises a main tube 100c, a connector tube 104c, and an adjustable collar pivot 107c.

As better shown in FIG. 3d, the swing arm 32c comprises a link bracket 110c, a swing arm pivot 112c and a rear wheel axle attachment 114c.

Referring back to FIG. 3a as well as FIGS. 3b–3d, a handle bar 26c for turning a front wheel 30c is connected to the main frame 20c. The front wheel 30c is connected to the main frame 20c by a front fork 28c via a front wheel axle attachment 29c. A seat 24c is connected to the seat frame 22c via the adjustable collar pivot 107c.

The seat frame 22c is attached to the main frame 20c by connecting the main tube 100c of the seat frame 22c to the seat frame bracket 81c of the main frame 20c, and by attaching the connector tube 104c of the seat frame 22c to the link bracket 110c of the swing arm 32c which is connected to the swing arm pivot bracket 94c of the main frame 20c.

The swing arm 32c is attached to the main frame 20c by connecting the swing arm pivot 112c of the swing arm 32c to the swing arm pivot bracket 94c of the main frame 20c, and by connecting the link bracket 110c of the swing arm 32c to a shock absorber 42c. The shock absorber 42c is connected between the link bracket 110c and the seat frame bracket 81c. A rear wheel 34c is attached to the swing arm 32c via a rear wheel axle attachment 114c.

In addition, since the embodiment of FIG. 3 does not implement a rocker arm 40, the suspension setup is less flexible than the embodiments of FIGS., 2 and 4. FIG. 5 is similar to FIG. 3 in this regard. The common pivot of the seat frame 22c, swing arm 32c, and the shock absorber 42c causes each component to be interdependent on the others. In other words, the tuning of one component will affect the others.

Figures 4B, 4C:
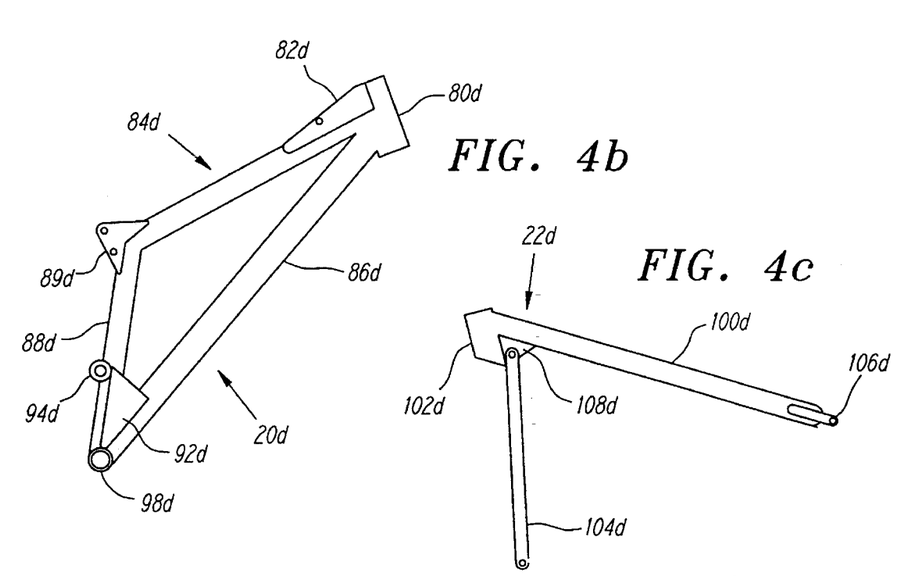
FIG. 4b is a detailed view of the main frame.
FIG. 4c is a detailed view of the seat frame.
Figure 4D:
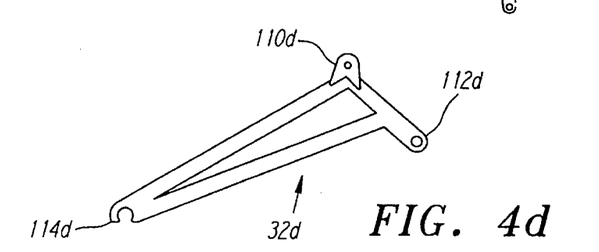
FIG. 4d is a detailed view of the swing arm.

FIG. 4 Embodiment Description

FIGS. 4a–4d illustrate a preferred embodiment of an improved suspension system for a bicycle 10d. The bicycle 10d comprises a main frame 20d, a seat frame 22d and a swing arm 32d.

As better shown in FIG. 4b, the main frame 20d comprises a head tube 80d, a head tube gusset 82d, a top tube 84d, a down tube 86d, a rear tube 88d, a shock absorber/rocker arm strut bracket 89d, a pivot gusset 92d, a swing arm pivot bracket 94d, and a bottom bracket 98d. A pedal assembly 99d, as partially shown in FIG. 4a, is attached to the bottom bracket 98d in a standard manner.

As better shown in FIG. 4c, the seat frame 22d comprises a main tube 100d, a seat tube 102d, a connector tube 104d, a main tube pivot link 106d, and a connector tube pivot 108d.

As better shown in FIG. 4d, the swing arm 32d comprises a link bracket 110d, a swing arm pivot 112d and a rear wheel axle attachment 114d.

Referring back to FIG. 4a as well as FIGS. 4b–4d, a handle bar 26d for turning a front wheel 30d is connected to the main frame 20d. The front wheel 30d is connected to the main frame 20d by a front fork 28d via a front wheel axle attachment 29d. A seat 24d is connected to the seat frame 22d via the seat tube 102d.

The seat frame 22d is attached to the main frame 20d by connecting the main tube pivot link 106d of the seat frame 22d to the head tube gusset 82d of the main frame 20d, and by attaching the connector tube 104d of the seat frame 22d to a rocker arm 40d which is connected to the link bracket 110d of the swing arm 32d which in turn is connected to the swing arm pivot bracket 94d of the main frame 20d via the swing arm pivot 112d. A shock absorber 42d is connected between the rocker arm 40d and the shock absorber/rocker arm strut bracket 89d. A rocker arm strut 46d is also connected between the rocker arm 40d and the shock absorber/rocker arm strut bracket 89d.

The swing arm 32d is attached to the main frame 20d by connecting the swing arm pivot 112d of the swing arm 32d to the swing arm pivot bracket 94d of the main frame 20d, and by connecting the link bracket 110d of the swing arm 32d to the shock absorber 42d which connects to the shock absorber/rocker arm strut bracket 89d of the main frame 20d. A rear wheel 34d is attached to the swing arm 32d via a rear wheel axle attachment 114d.

FIG. 5 Embodiment Description

FIGS. 5a–5d illustrate a preferred embodiment of an improved suspension system for a bicycle 10e. The bicycle 10e comprises a main frame 20e, a seat frame 22e and a swing arm 32e.

Figures 5B, 5C, 5D:
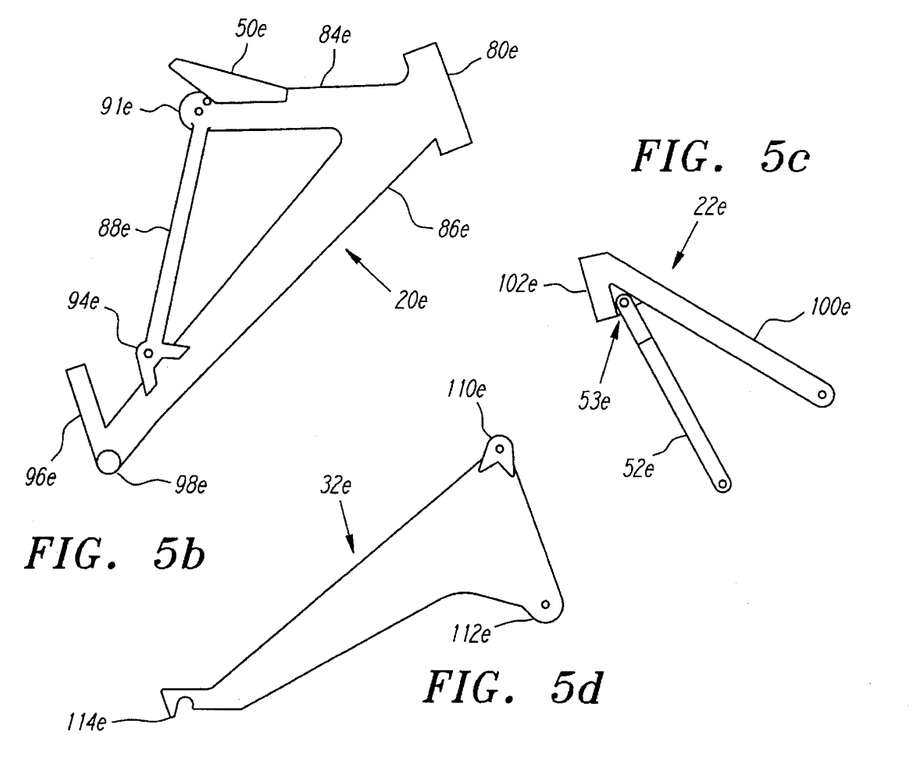
FIG. 5b is a detailed view of the main frame.
FIG. 5c is a detailed view of the seat frame.
FIG. 5d is a detailed view of the swing arm.

As better shown in FIG. 5b, the main frame 20e comprises a seat stop 50e, a head tube 80e, a top tube 84e, a down tube 86e, a rear tube 88e, a shock absorber bracket 91e, a swing arm pivot bracket 94e, a derailleur tube 96e and a bottom bracket 98e. A pedal assembly 99e, as partially shown in FIG. 5a, is attached to the bottom bracket 98e in a standard manner.

As better shown in FIG. 5c, the seat frame 22e comprises a compression strut 52e, a compression strut pivot 53e, a main tube 100e, and a seat tube 102e.

As better shown in FIG. 5d, the swing arm 32e comprises a link bracket 110e, a swing arm pivot 112e and a rear wheel axle attachment 114e.

Referring back to FIG. 5a as well as FIGS. 5b–5d, a handle bar 26e for turning a front wheel 30e is connected to the main frame 20e. The front wheel 30e is connected to the main frame 20e by a front fork 28e via a front wheel axle attachment 29e. A seat 24e is connected to the seat frame 22e via the seat tube 102e.

The seat frame 22e is attached to the main frame 20e by connecting the main tube 100e of the seat frame 22e to the shock absorber bracket 91e of the main frame 20e, and by attaching the compression strut 52e of the seat frame 22e to the link bracket 110e of the swing arm 32e which in turn is connected to the swing arm pivot bracket 94e of the main frame 20e via the swing arm pivot 112e. A shock absorber 42e is attached between the link bracket 110e of the swing arm 32e and the shock absorber bracket 91e of the main frame 20e.

The swing arm 32e is attached to the main frame 20e by connecting the swing arm pivot 112e of the swing arm 32e to the swing arm pivot bracket 94e of the main frame 20e, and by connecting the link bracket 110e of the swing arm 32e to the shock absorber 42e which connects to the shock absorber bracket 91e of the main frame 20e. A rear wheel 34e is attached to the swing arm 32e via a rear wheel axle attachment 114e.

The description of FIG. 5 is similar to the description of FIG. 3 above. However, FIG. 5 further discloses an additional feature as described in further detail below.

Detailed View Of The Compression Strut

Figure 5E:
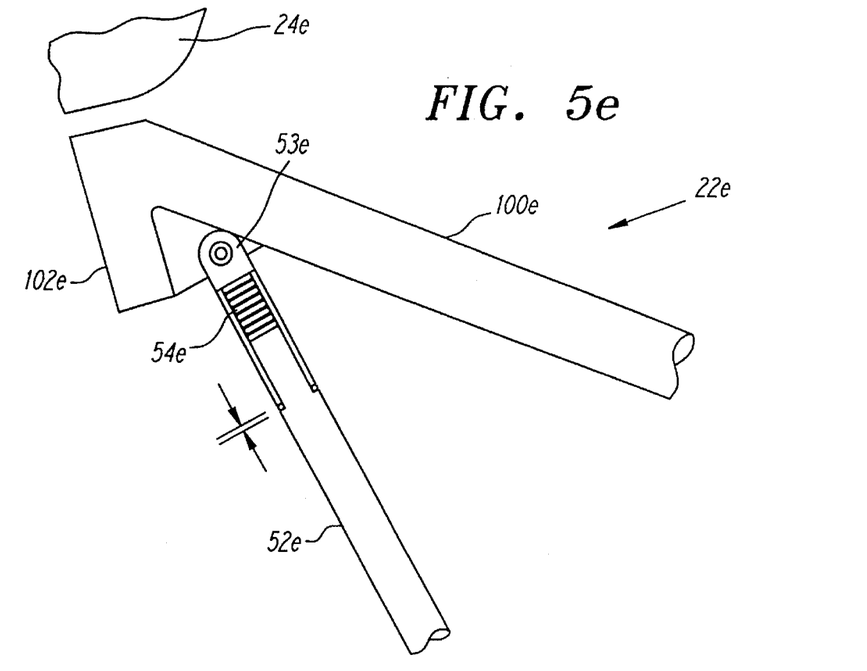
FIG. 5e and FIG. 5f are cutaway detail views of the seat frame of the preferred embodiment as shown in FIG. 5a and FIG, 5c.
Figure 5F:
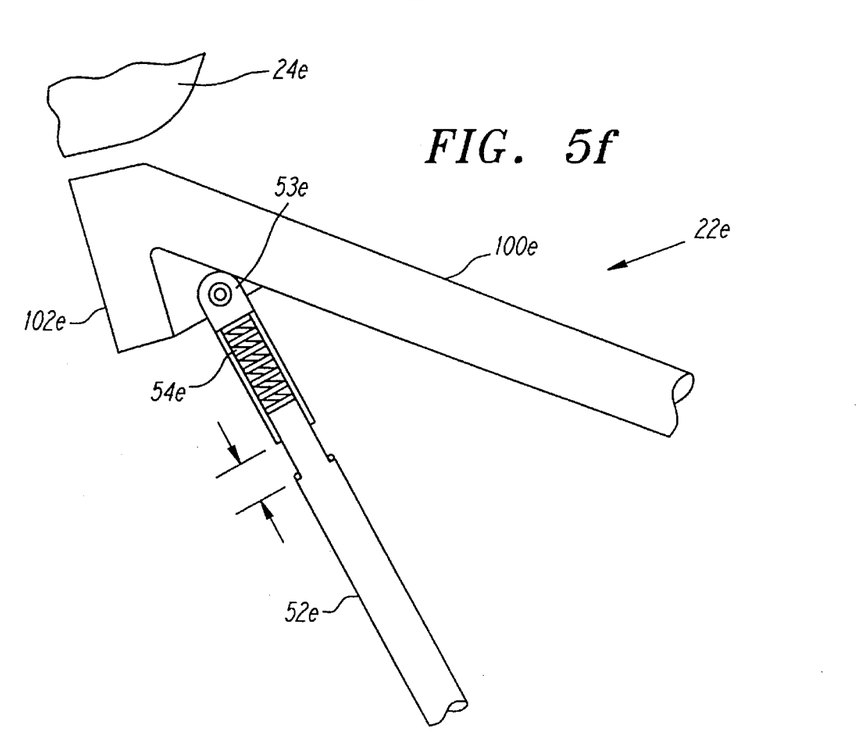

FIG. 5e and FIG. 5f show detailed views of the compression strut 52e in its compressed position (e) and in its extended position (D). Since the swing arm 32e and the seat frame 22e are interconnected at the link bracket 110e, movement of the swing arm 32e will cause a movement in the seat frame 22e. The added benefit of this embodiment of the suspension system is that when the rider is out of the seat 24e, the seat 24e is held in its fully extended, or upwardmost position (unless weighted by the rider) due to the force of a compression strut spring 54e exerting an extending vertical force on the seat 24e. The compression strut pivot 53e enables the main tube 100e to move relative to the compression strut 52e.

Thus, despite any play that the seat frame 22e may have up and down when the swing arm 32e moves up and down, the compression strut spring 54e will ensure that the main tube 100e remains in its maximum position abutted against the seat stop 50e. This variation, where the seat 24e does not move relative to the rider, is desirable for those riders who, while standing, prefer that the seat 24e remains stationary.

Some riders hold the seat 24e between their thighs for stability while negotiating steep descents, and therefore prefer the stationary seat 24e.

On the other hand, the weight of a rider in a sitting position will overcome the compression strut spring's 54e resistance such that the compression strut 52e will be in its fully compressed position and will thereby enable the seat frame 22e to exert a compressing force on the shock absorber 42e.

Figures 6B, 6C:
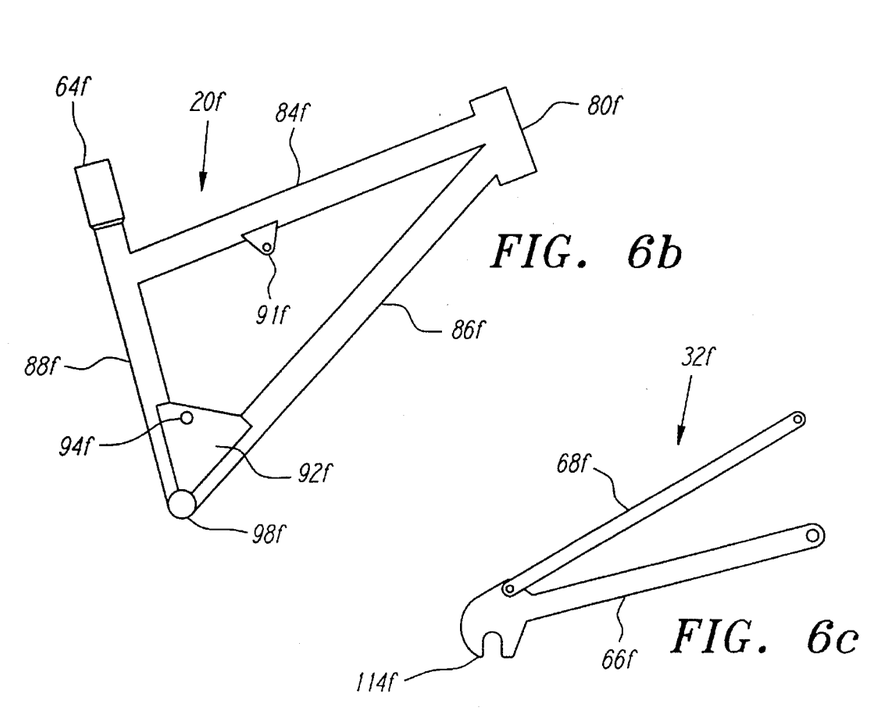
FIG. 6b is a detailed view of the main frame.
FIG. 6c is a detailed view of the swing arm.

FIG. 6 Embodiment Description

FIGS. 6a–6c illustrate a preferred embodiment of an improved suspension system for a bicycle 10f. The bicycle 10f comprises a main frame 20f and a swing arm 32f.

As better shown in FIG. 6b, the main frame 20f comprises a seat activated hydraulic cylinder 64f, a head tube 80f, a top tube 84f, a down tube 86f, a rear tube 88f, a shock absorber bracket 91f, a pivot gusset 92f, a swing arm pivot bracket 94f, and a bottom bracket 98f. A pedal assembly 99f, as partially shown in FIG. 6a, is attached to the bottom bracket 98f in a standard manner.

As better shown in FIG. 6c, the swing arm 32f comprises a swing arm pivot tube 66f, a swing arm shock tube 68f and a rear wheel axle attachment 114f.

Referring back to FIG. 6a as well as FIGS. 6b and 6c, a handle bar 26f for turning a front wheel 30f is connected to the main frame 20f. The front wheel 30f is connected to the main frame 20f by a front fork 28f via a front wheel axle attachment 29f. A seat 24f is connected to the main frame 20f via the seat activated hydraulic cylinder 64f.

The swing arm 32f is attached to the main frame 20f by connecting the swing arm pivot tube 66f of the swing arm 32f to the swing arm pivot bracket 94f of the main frame 20f, and by connecting the swing arm shock tube 68f of the swing arm 32f to a shock absorber with hydraulically tuned characteristics 60f which is connected to the shock absorber bracket 91f of the main frame 20f. A hydraulic line 62f is connected between the seat activated hydraulic cylinder 64f and the shock absorber with hydraulically tuned characteristics 60f, and a rear wheel 34f is attached to the swing arm 32f via a rear wheel axle attachment 114f.

This embodiment provides for a suspension system's characteristics change of any rear suspension system via a seat activated hydraulic cylinder 64f which acts as a remote actuator. When the weight of a rider is placed on the seat 24f, the seat activated hydraulic cylinder 64f can exert hydraulic pressure or reduce hydraulic pressure in the shock absorber with hydraulically tuned characteristics 60f, thereby affecting the characteristics of the suspension system based upon whether the rider is sitting or standing.

Additionally, the seat activated hydraulic cylinder 64f has a tremendous advantage in that the seat activated hydraulic cylinder 64f, along with the shock absorber with hydraulically tuned characteristics 60f, could be produced and sold as an aftermarket improvement, capable of being added to any rear suspension bicycle 10.

Figures 7B, 7C, 7D:
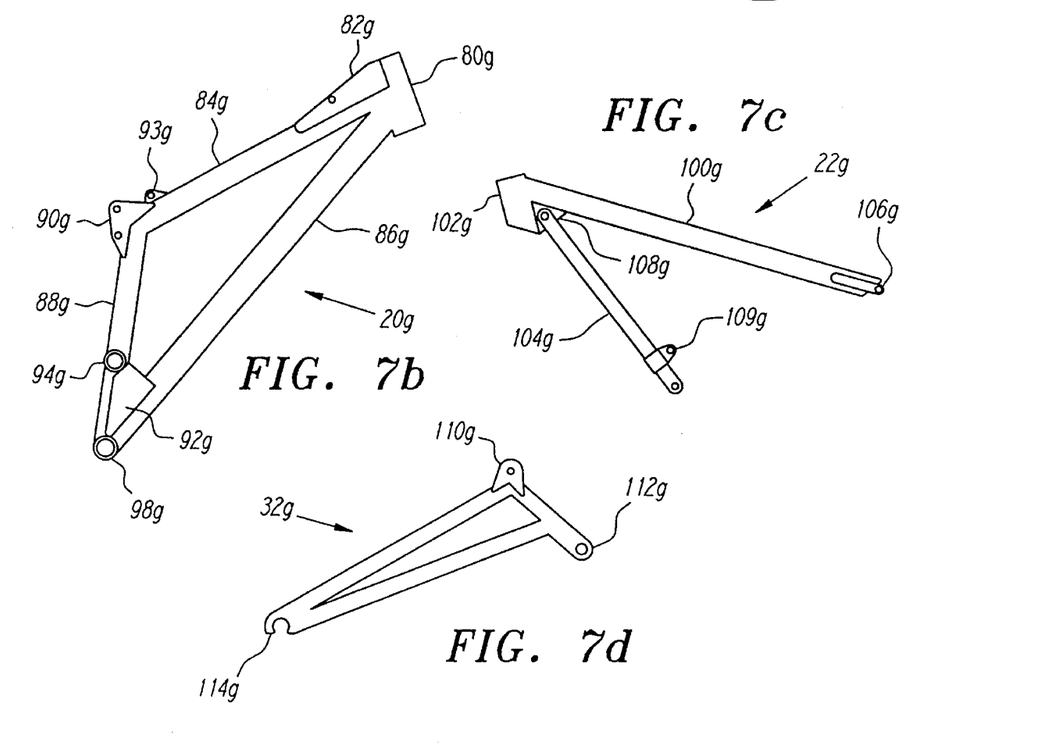
FIG. 7b is a detailed view of the main frame.
FIG. 7c is a detailed view of the seat frame.
FIG. 7d is a detailed view of the swing arm.

FIG. 7 Embodiment Description

FIGS. 7a–7d illustrate a preferred embodiment of an improved suspension system for a bicycle 10g. The bicycle 10g comprises a main frame 20g, a seat frame 22g and a swing arm 32g.

As better shown in FIG. 7b, the main frame 20g comprises a head tube 80g, a head tube gusset 82g, a top tube 84g, a down tube 86g, a rear tube 88g, a rocker arm bracket 90g, a pivot gusset 92g, a spring bracket 93g, a swing arm pivot bracket 94g, and a bottom bracket 98g. A pedal assembly 99g, as partially shown in FIG. 7a, is attached to the bottom bracket 98g in a standard manner.

As better shown in FIG. 7c, the seat frame 22g comprises a main tube 100g, a seat tube 102g, a connector tube 104g, a main tube pivot link 106g, a connector tube pivot 108g, and a spring mount 109g.

As better shown in FIG. 7d, the swing arm 32g comprises a link bracket 110g, a swing arm pivot 112g and a rear wheel axle attachment 114g.

Referring back to FIG. 7a as well as FIGS. 7b–7d, a handle bar 26g for turning a front wheel 30g is connected to the main frame 20g. The front wheel 30g is connected to the main frame 20g by a front fork 28g via a front wheel axle attachment 29g. A seat 24g is connected to the seat frame 22g via the seat tube 102g.

The seat frame 22g is attached to the main frame 20g by connecting the main tube pivot link 106g of the seat frame 22g to the head tube gusset 82g of the main frame 20g, and by attaching the connector tube 104g of the seat frame 22g to a rocker arm 40g which is connected to the rocker arm bracket 90g of the main frame 20g.

The swing arm 32g is attached to the main frame 20g by connecting the swing arm pivot 112g of the swing arm 32g to the swing arm pivot bracket 94g of the main frame 20g, and by connecting the link bracket 110g of the swing arm 32g to a shock absorber with mechanically adjustable characteristics 72g which connects to the rocker arm bracket 90g. A connecting link 44g is connected between the rocker arm 40g and the shock absorber with mechanically adjustable characteristics 72g.

A rear wheel 34g is attached to the swing arm 32g via a rear wheel axle attachment 114g. A compression spring 70g is connected between the spring mount 109g and the spring bracket 93g.

Here, the compression spring 70g exerts a strong expanding force capable of offsetting most of a rider's weight. When a rider sits on the seat 24g, the connector tube 104g will slightly compress the compression spring 70g and pivot the rocker arm 40g about the rocker arm bracket 90g. This causes the connecting link 44g to move upwards. The shock absorber with mechanically adjustable characteristics 72g is designed such that the upward movement of the connecting link 44g mechanically adjusts the characteristics of the shock absorber 72g.

While the above description contains many specificities, these should not be construed as limitations on the scope of the invention, but rather as an exemplification of various preferred embodiments thereof. Many other variations are possible.

For example, whereas the drawings show pivots to accommodate rotational movement of various parts, there are some alternatives. For instance, one could mold a one-piece carbon fiber main frame and integral seat main tube which will flex at their junction. Advantages which can be gained by such a design include stiffness, inherent springiness and light weight.

Furthermore, the shock absorber can be a spring/damper type, a hydraulically adjustable type, a mechanically adjustable type, an oil/air piston type, or any other equivalent component.

In addition, features shown embodied in one figure, such as the compression strut spring 54e loaded compression strut 52e of FIG. 5, can be implemented in another embodiment by a person of ordinary skill in the art.

Accordingly, the scope of the present invention should be determined not by the embodiments illustrated, but by the appended claims and their legal equivalents.

What is claimed is:

1. A bicycle suspension system comprising
   a main frame capable of receiving a handle bar and a front fork, said front fork being capable of receiving a front wheel,
   a pedal assembly attached to said main frame for manual rotation by a rider, said pedal assembly capable of providing rotational energy to a rear wheel thereby propelling a bicycle forward,
   a seat frame capable of receiving a seat and being pivotally coupled to said main frame,
   a swing arm capable of receiving the rear wheel and being pivotally coupled to said main frame, and
   only one shock absorber, said shock absorber being positioned relative to said seat frame and said swing arm adapted to provide a stiffer suspension when a rider is in a standing position which would generate an upward force on said swing arm to thereby cause said swing arm to pivot about said main frame in a manner so as to exert a first compression force on said shock absorber, and a softer suspension when a rider is in a sitting position which would generate said upward force on said swing arm and would further generate a downward force on said seat frame to thereby cause said seat frame to pivot about said main frame in a manner so as to exert a second compression force on said shock absorber.

2. The bicycle suspension system of claim 1, wherein said shock absorber is coupled to said seat frame and responsive to a pivotal movement of said swing arm.

3. The bicycle suspension system of claim 2, further comprising
   a swing arm pivot bracket connected to said main frame,
   a rocker arm,
   a rocker arm strut comprising a first end and a second end,
      said first end of said rocker arm strut being pivotally connected to said swing arm pivot bracket,
      said second end of said rocker arm strut being pivotally connected to said rocker arm,
      said shock absorber being connected between said swing arm pivot bracket and said rocker arm,
      said swing arm being pivotally connected to said swing arm pivot bracket and coupled to said rocker arm,
      said upward force on said swing arm causing said swing arm to pivot about said swing arm pivot bracket in a manner so as to exert said first compression force on said shock absorber via said rocker arm,
      said seat frame being pivotally connected to said main frame and said rocker arm, and
      said downward force on said seat frame causing said seat frame to pivot about said main frame in a manner so as to exert said second compression force on said shock absorber via said rocker arm.

4. The bicycle suspension system of claim 2, further comprising
   a rocker arm bracket connected to said main frame,
   a swing arm pivot bracket connect to said main frame, a rocker arm pivotally connected to said rocker arm bracket, said shock absorber being connected between said main frame and said rocker arm, said swing arm being pivotally connected to said swing arm pivot bracket and coupled to said rocker arm, said upward force on said swing arm causing said swing arm to pivot about said swing arm pivot bracket in a manner so as to exert said first compression force on said shock absorber via said rocker arm, said seat frame being pivotally connected to said main frame and said rocker arm, and said downward force on said seat frame causing said seat frame to pivot about said main frame in a manner so as to exert said second compression force on said shock absorber via said rocker arm.

5. The bicycle suspension system of claim 2, further comprising a link bracket connected to said swing arm,
said shock absorber connected between said main frame and said link bracket, and
said seat frame coupled to said link bracket.

6. The bicycle suspension system of claim 2, further comprising a shock absorber/rocker arm strut bracket connected to said main frame, a rocker arm, a rocker arm strut connected between said shock absorber/rocker arm strut bracket and said rocker arm,
said shock absorber being connected between said shock absorber/rocker arm strut bracket and said rocker arm,
said swing arm being connected to said shock absorber and said rocker arm,
said seat frame being pivotally connected to said rocker arm, and
said downward force on said seat frame causing said seat frame to pivot about said main frame in a manner so as to exert said second compression force on said shock absorber via said rocker arm.

7. The bicycle suspension system of claim 2, further comprising a link bracket connected to said swing arm, a seat stop connected to said main frame, a compression strut connected to said seat frame,
said shock absorber being connected between said main frame and said link bracket,
said compression strut being pivotally connected to said link bracket and being spring loaded such that the tendency of said compression strut is to maintain an extended position,
said downward force on said seat frame causing said seat frame to pivot about said main frame in a manner so as to exert said second compression force on said shock absorber via said compression strut and said link bracket,
said seat stop for preventing said compression strut from extending said seat frame beyond a predetermined height, and
said compression strut being spring loaded to a level such that said compression strut is capable of supporting said seat frame, and
wherein the rider in the sitting position would exert said downward force on said seat frame causing said seat frame to pivot about said main frame in a manner so as to compress said compression strut to a minimum position such that said compression strut and said seat frame exert said second compression force on said shock absorber.

8. The bicycle suspension system of claim 2, further comprising a rocker arm bracket connected to said main frame, a rocker arm pivotally connected to said rocker arm bracket,
said shock absorber having mechanically adjustable characteristics and being connected to said rocker arm bracket and coupled to said rocker arm,
said swing arm being connected to said shock absorber having mechanically adjustable characteristics,
said upward force on said swing arm causing said swing arm to pivot about said main frame in a manner so as to exert said first compression force on said shock absorber having mechanically adjustable characteristics,
said seat frame pivotally connected to said rocker arm,
said downward force on said seat frame causing said seat frame to pivot about said main frame in a manner so as to exert a mechanically adjusting force on said shock absorber having mechanically adjustable characteristics via said rocker arm, and
said mechanically adjusting force modifying the characteristics of said shock absorber having mechanically adjustable characteristics.

9. A bicycle suspension system comprising a main frame capable of receiving a handle bar and a front fork, said front fork being capable of receiving a front wheel, a pedal assembly attached to said main frame for manual rotation by a rider, said pedal assembly capable of providing rotational energy to a rear wheel thereby propelling a bicycle forward, a seat frame capable of receiving a seat and being pivotally coupled to said main frame, a swing arm capable of receiving the rear wheel and being pivotally coupled to said main frame, a shock absorber being positioned relative to said seat frame and said swing arm for providing a stiffer suspension when the rider is in a standing position and a softer suspension when the rider is in a sitting position, a swing arm pivot bracket connected to said main frame, a rocker arm, a rocker arm strut comprising a first end and a second end,
said first end of said rocker arm strut being pivotally connected to said swing arm pivot bracket,
said second end of said rocker arm strut being pivotally connected to said rocker arm,
said shock absorber being coupled to said seat frame and responsive to a pivotal movement of said swing arm,
said standing position generating an upward force on said swing arm thereby causing said swing arm to pivot about said main frame in a manner so as to exert a first compression force on said shock absorber,
said sitting position generating said upward force on said swing arm and further generating a downward force on said seat frame thereby causing said seat frame to pivot about said main frame in a manner so as to exert a second compression force on said shock absorber, said shock absorber being connected between said swing arm pivot bracket and said rocker arm, said swing arm being pivotally connected to said swing arm pivot bracket and coupled to said rocker arm, said upward force on said swing arm causing said swing arm to pivot about said swing arm pivot bracket in a manner so as to exert said first compression force on said shock absorber via said rocker arm, said seat frame being pivotally connected to said main frame and said rocker arm, and said downward force on said seat frame causing said seat frame to pivot about said main frame in a manner so as to exert said second compression force on said shock absorber via said rocker arm.

10. A bicycle suspension system comprising a main frame capable of receiving a handle bar and a front fork, said front fork being capable of receiving a front wheel, a pedal assembly attached to said main frame for manual rotation by a rider, said pedal assembly capable of providing rotational energy to a rear wheel thereby propelling a bicycle forward, a seat frame capable of receiving a seat and being pivotally coupled to said main frame, a swing arm capable of receiving the rear wheel and being pivotally coupled to said main frame, a shock absorber being positioned relative to said seat frame and said swing arm adapted to provide a stiffer suspension when a rider is in a standing position which would generate an upward force on said swing arm to thereby cause said swing arm to pivot about said main frame in a manner so as to exert a first compression force on said shock absorber, and a softer suspension when a rider is in a sitting position which would generate said upward force on said swing arm and would further generate a downward force on said seat frame to thereby cause said seat frame to pivot about said main frame in a manner so as to exert a second compression force on said shock absorber, said shock absorber being coupled to said seat frame and responsive to a pivotal movement of said swing arm, a swing arm pivot bracket connected to said main frame, a rocker arm, a rocker arm strut comprising a first end and a second end,
said first end of said rocker arm strut being pivotally connected to said swing arm pivot bracket, said second end of said rocker arm strut being pivotally connected to said rocker arm, said shock absorber being connected between said swing arm pivot bracket and said rocker arm, said swing arm being pivotally connected to said swing arm pivot bracket and coupled to said rocker arm, said upward force on said swing arm causing said swing arm to pivot about said swing arm pivot bracket in a manner so as to exert said first compression force on said shock absorber via said rocker arm, said seat frame being pivotally connected to said main frame and said rocker arm, and said downward force on said seat frame causing said seat frame to pivot about said main frame in a manner so as to exert said second compression force on said shock absorber via said rocker arm.

* * * * *